United States Patent [19]

Knake

[11] 4,356,934

[45] Nov. 2, 1982

[54] APPARATUS FOR SPRAY-TREATING SEEDS DURING PLANTING

[75] Inventor: Raymond P. Knake, Urbandale, Iowa

[73] Assignee: Chevron Research Company, San Francisco, Calif.

[21] Appl. No.: 243,617

[22] Filed: Mar. 13, 1981

Related U.S. Application Data

[63] Continuation of Ser. No. 852,993, Nov. 18, 1977, abandoned.

[51] Int. Cl.³ .............................................. A01C 1/06
[52] U.S. Cl. ...................................... 221/96; 222/318
[58] Field of Search ................. 221/96, 135, 211, 278; 222/129, 318; 111/1 R, 6, 85; 47/57.6, 58, DIG. 9; 118/300, 303

[56] References Cited

U.S. PATENT DOCUMENTS

| | | | |
|---|---|---|---|
| 3,848,552 | 11/1974 | Bauman et al. | 221/211 X |
| 3,885,704 | 5/1975 | Lienemann et al. | 221/211 |
| 3,976,030 | 8/1976 | Ragsdale et al. | 118/303 |

Primary Examiner—Stanley H. Tollberg
Attorney, Agent, or Firm—Burns, Doane, Swecker & Mathis

[57] ABSTRACT

An in-the-field seed treating method and apparatus in which a treating fluid, such as an emulsion containing an insecticide, fungicide, or bactericide or the like, is sprayed onto seeds as they move from a seed hopper to a planting tube and into a planting furrow. The system is particularly directed to a plateless planter using an air pick-up system, either positive or negative pressure relative to atmosphere, for selecting seeds from a rotating drum or an intermediate pick-up chamber. In one form, the system permits air, heated by compression, to flow over the coated seeds to dry the coating as they rotate in a planting drum or disk; thus, the coating is dried on the seeds before introduction into the planting tube so that coating is not lost and the planting tubes remain clean. A hydraulic control circuit is disclosed for regulating flow of treating fluid from a "bypass" nozzle to an exceptionally low range, from about 0.2 to 5 gallons per hour. Such low rates also assure that seed coating is dried before the seeds are planted.

1 Claim, 6 Drawing Figures

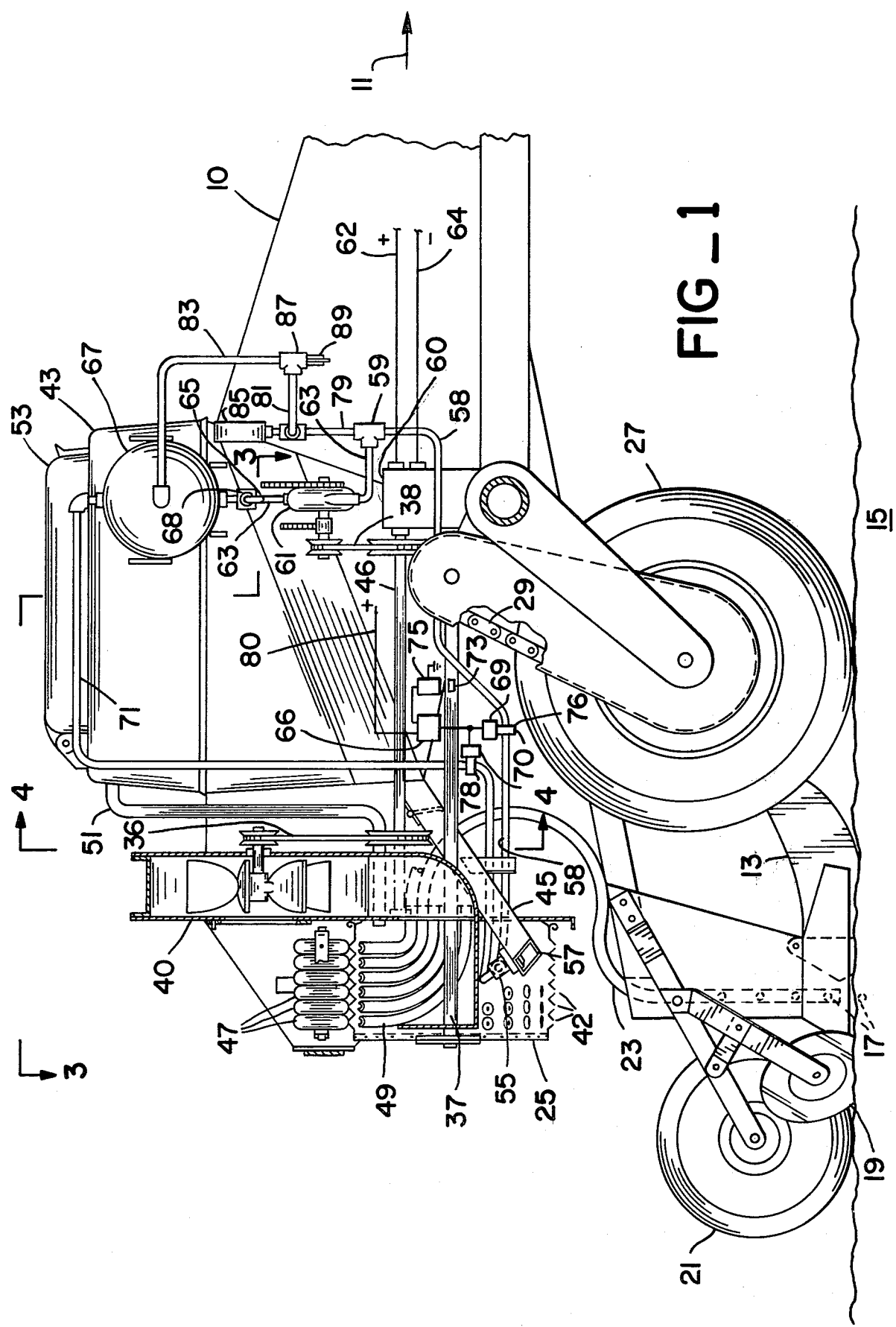

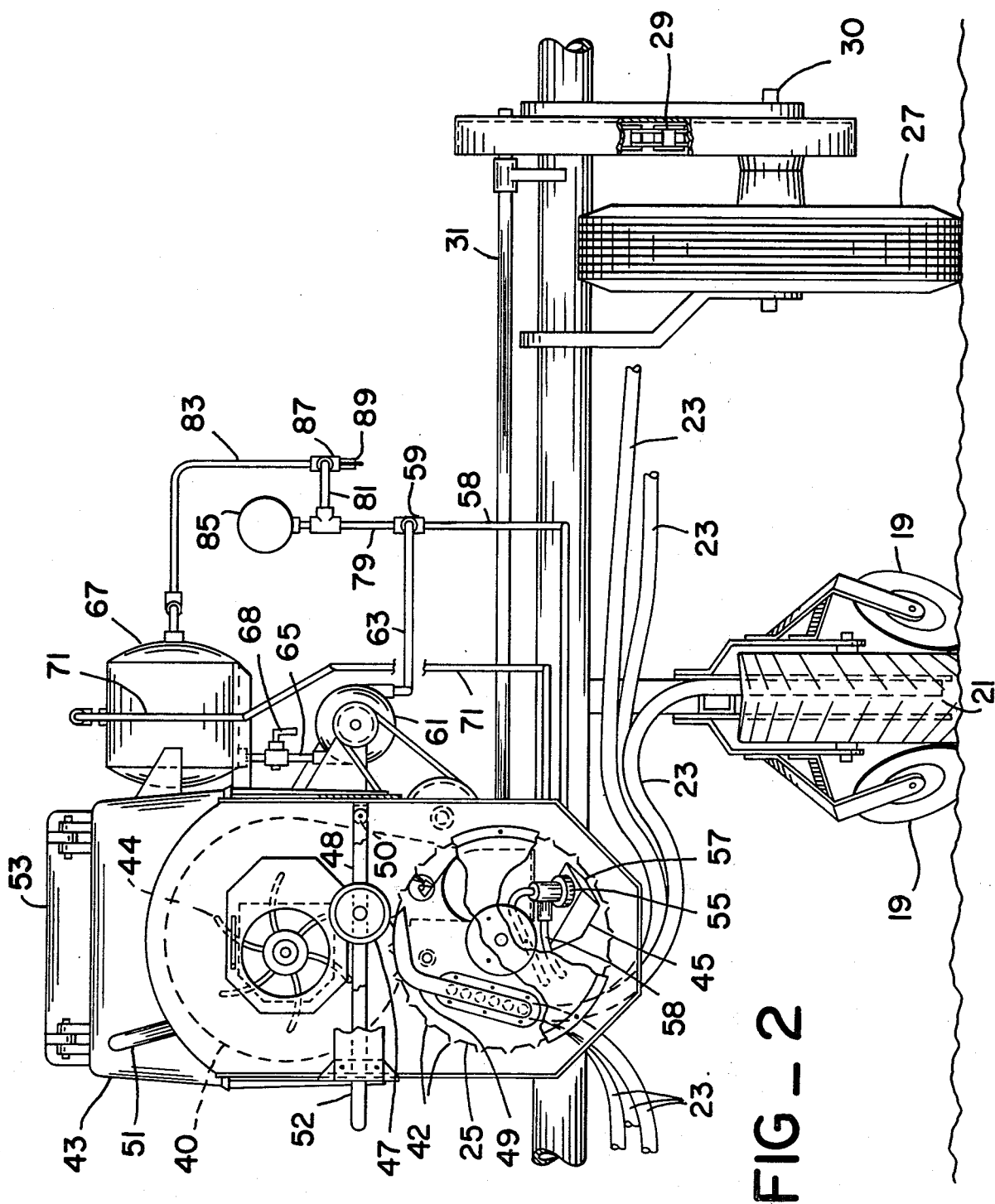
FIG_2

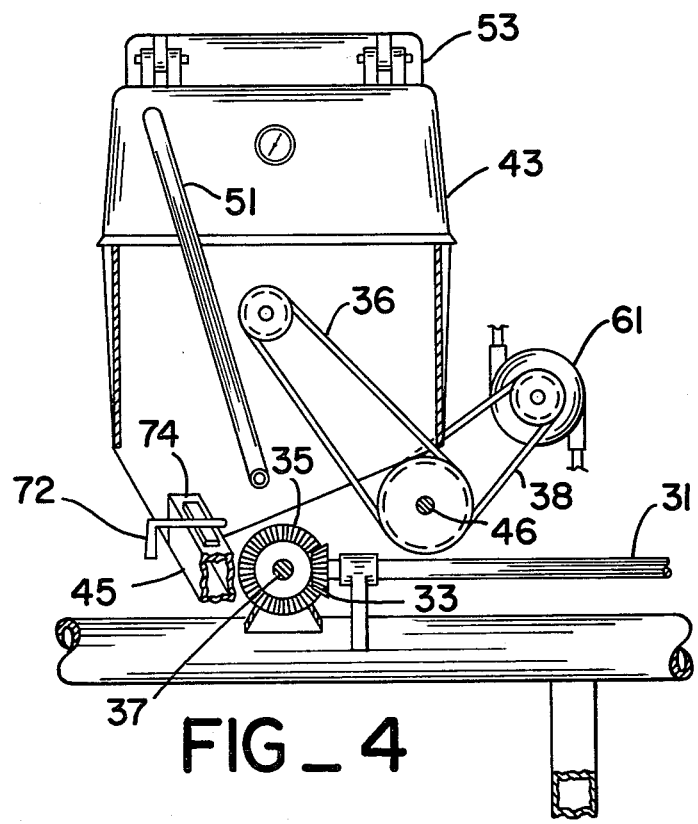
FIG_4
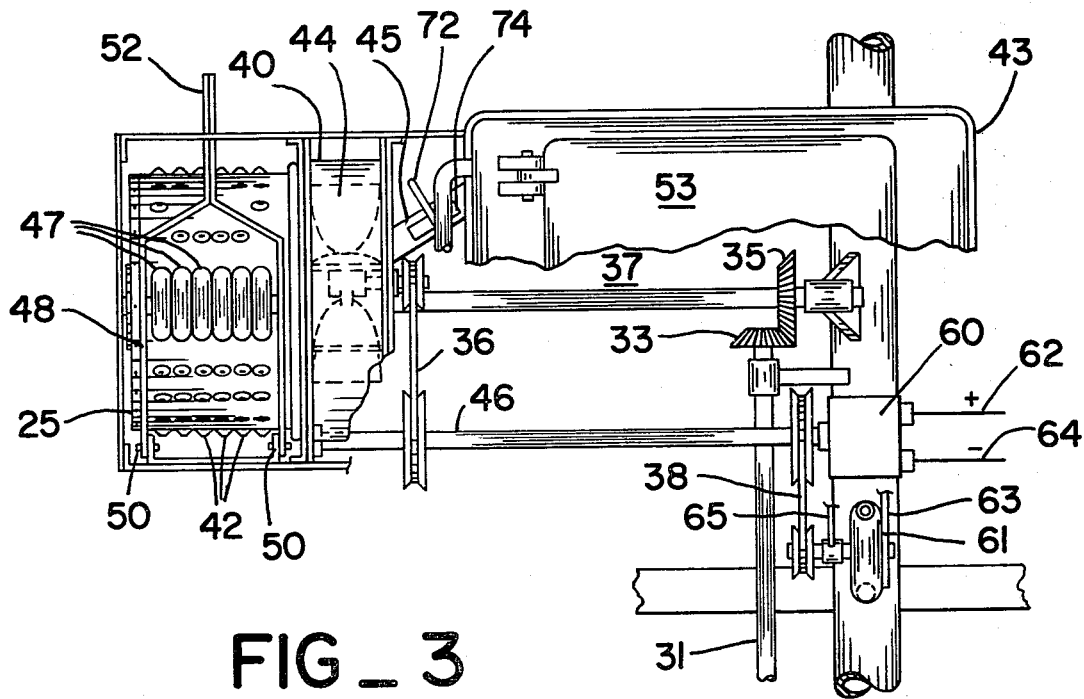
FIG_3

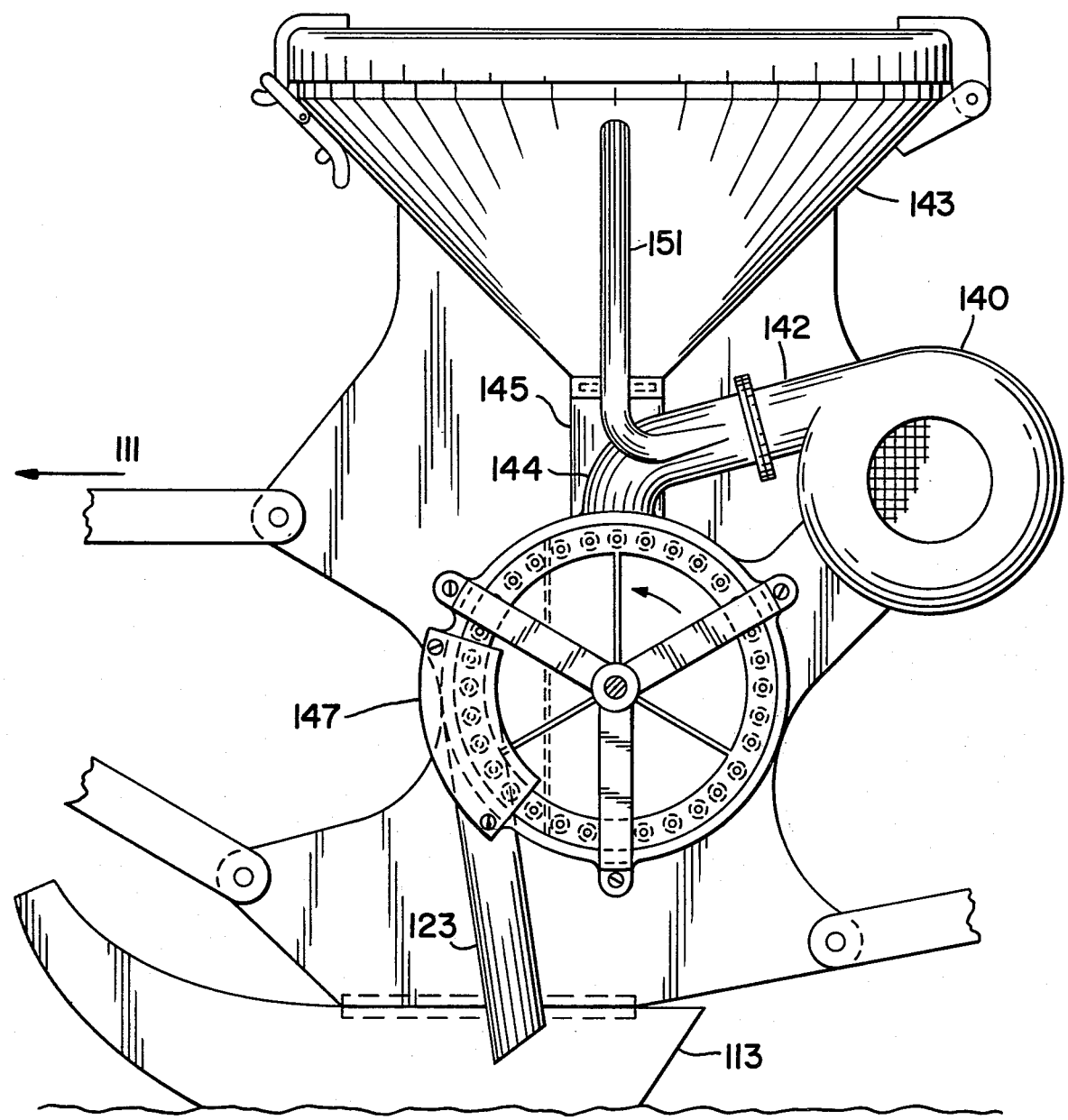
FIG_5

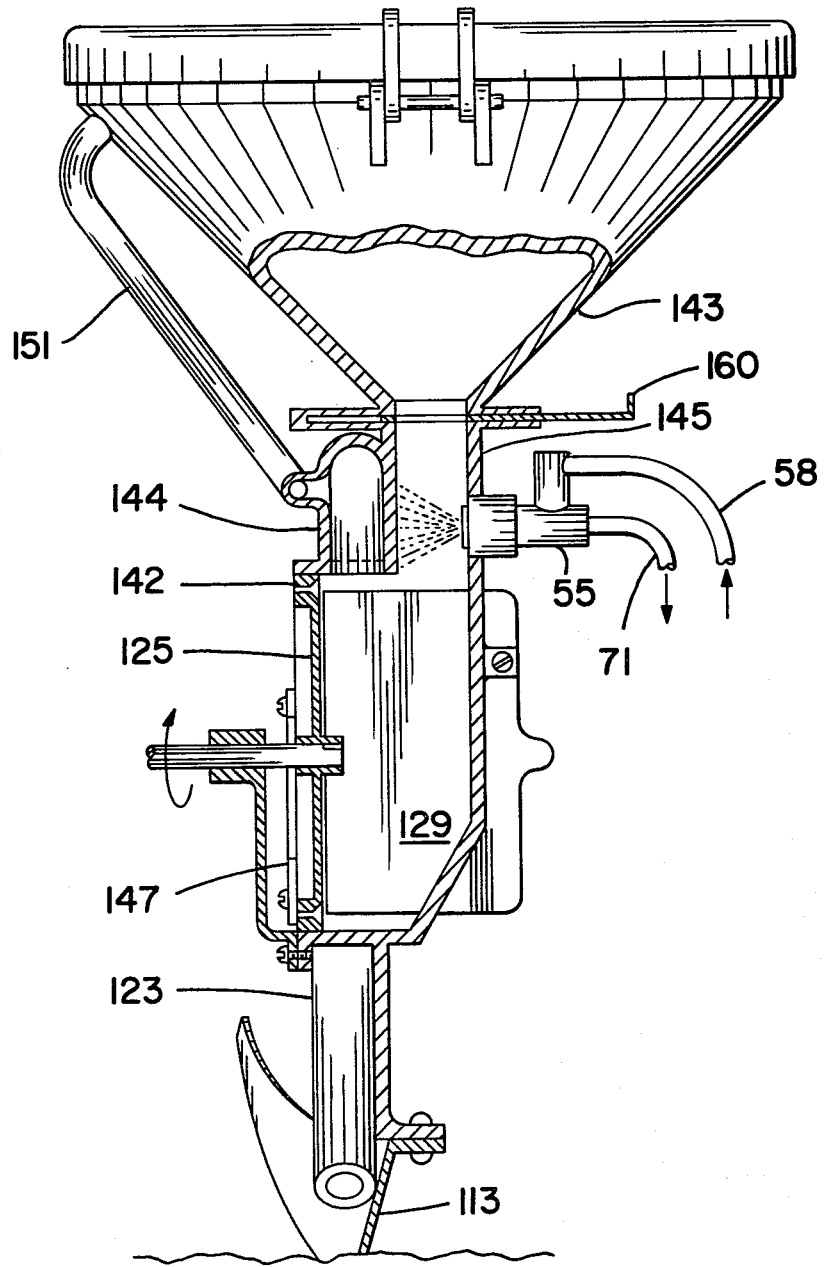
FIG_6

APPARATUS FOR SPRAY-TREATING SEEDS DURING PLANTING

This is a continuation, of application Ser. No. 852,993, filed Nov. 18, 1977 abandoned.

BACKGROUND OF THE INVENTION

This invention relates to a method of, and apparatus for, treating seeds with a chemical just prior to planting. More particularly, it relates to an in-the-field treating system in which untreated seeds are sprayed with a moist chemical as the seed is being transferred from a grain hopper to a furrow by a seed planter of the "plateless" type, such as those commonly used for planting corn, wheat, sorghum, and other field-grown grains or vegetable crops.

PRIOR ART

It has been known heretofore to treat seed prior to planting but, in general, seed has been treated as it is transferred from seed storage into a field planting hopper. Unfortunately, if excess seed is treated in this manner, the seed must be destroyed so that treated seed will not be inadvertently returned to storage and mixed with grain otherwise suitable for sale as food. The potential financial loss can be substantial and the danger of contamination of food seed be treated, but unplanted, seed is high. U.S. Pat. No. 2,731,770 (Rhea) discloses such a system for treating seeds as they are transferred from a grain bin to a truck or the like. While the patentee discusses the desirability of forming an emulsion for treating seed to avoid the problem of treating with dusts, the emulsion is applied to seed as it passes through the grain chute between storage and the field planter. While it is asserted that the emulsion is dried on the grain, it is to be noted that no provision is specifically made for drying the grain coating.

U.S. Pat. No. 4,023,525 (Weber) discloses a similar system wherein an auger drive loads seed through a tube into a planter; seeds are coated by a spray treating arrangement in the tube so that the seed is treated before it enters the planter seed hopper.

It has also been proposed to treat seed by applying a dense fog to the ground as it is opened by a planting shoe or furrow opener, and as the seed is dropped. Alternatively, the seeds have been placed in a tumbler, or blender, and contacted by a fog of pesticide, preferably created by a hot gas. Such systems are disclosed in U.S. Pat. No. 3,162,152 (Regenstein et al). A primary difficulty with systems for applying a heated pesticide is the necessity of assuring that the chemical material is stable if heated and that seed will not be damaged. U.S. Pat. No. 3,482,735 (Goulter) discloses one form of plateless planter to which the present invention is adapted to be applied. More generally, planters of the type to which the present invention is directed are discussed in considerable detail in an article orally presented by Harold Wright, in The 1976 Proceedings of the 31st Corn and Sorghum Research Conference. This paper is entitled, "Influence of the Hybrid Industry on Planter Design".

SUMMARY OF THE INVENTION

In accordance with the present invention, seed is treated in the field just prior to planting by spray coating the seed with a fluid containing such materials as bactericides, fungicides or insecticides, and if desired, fertilizer. Preferably, the fluid is in the form of an emulsion and is applied at a rate not exceeding about 5 gallons per hour, and preferably not greater than about 2.0 gallons per hour. Spray rates of from about 0.05 to 1.0 gallons per hour are effective, and spray rates of from about 0.2 to 0.7 gallons per hour have been found to be especially effective in performing the method of the present invention. Seed sprayed with a treatment fluid or emulsion at such rates is effectively dried on the seed as it is being planted with a plateless planter using a pneumatic conveyor arrangement between the field seed hopper box and one or more seed tubes leading to a furrow. In such an apparatus, a furrow for receiving seeds from each tube may include a soil opener, such as a opener disk, covering disks and a press wheel. The coating on each individual seed is effectively dried as it passes through a seed selector, in the form of a rotatable planter disk or drum, which picks uup individual seeds and urges them into pockets, formed by perforations or holes in the drum or disk, by air flow across the disk or drum perforations. This air flow holds an individual seed in the pocket so that it is separated from other seeds in the drum and then deposits it in a seed conduit or tube leading to the furrow for planting. Preferably, the seeds are sprayed in the conduit, or transition section, interconnecting the seed hopper and the planting drum so that only seeds actually being distributed to an individual furrow are coated; they are promptly dried in the drum by air flow through the pockets or indentations. Preferably, my seed spraying system is adapted to be mounted on a planter drawn by a conventional tractor and may be automatically operated by forward drive of the planter. Alternatively, the system is remotely controlled from the tractor so that the operator of the planter may readily turn the seed sprayer on or off in accordance with the supply of grain from the hopper to the planting drum.

As particularly distinguished from the prior art, the present invention permits conventional seed treating materials, including nematocides, miticides, insecticides, rodenticides, fungicides, bactericides, and the like, to be applied at relatively low, but effective, rates in a stable emulsion. Such an emulsion requires only a carrier fluid, and permits spraying at relatively low rates directly on the seed as they are being planted. The fluid material is applied to the seeds at such a position in the seed flow to assure that the coating will be dried on the seed before it enters the planting tubes. A particular drawback, if the material is not fully dry at this point, is the possibility of coating or caking the inside of the conduits or planter tubes, particularly where a manifold and relatively long runs of small diameter flexible tubing carry seed pneumatically between the planting drum and the actual furrow. Furthermore, if a material is not promptly dried on the seed in the planting drum, the drum, itself, could be coated and plug the relatively small pockets or openings in the drum so that air will not flow around the seed and through the pockets to hold the seeds against gravity as they are turned from a picked-up position to a delivery position. Additionally, as mentioned before, loss of excessive amounts of relatively expensive treating material and unnecessary treatment of seeds is readily avoided by practice of the method of the present invention.

Plateless planters to which the present invention are directed are characterized by a furrow opener which opens the earth by forward movement of a tractor drawing the planter. As a furrow is opened, seeds are dropped into the furrow and disk means are disposed to throw dirt over the furrow and a following press wheel firmly tamps the seed in place. As mentioned before, a seed disk or drum is normally supplied with seed from a seed hopper through a conduit, or a transition chute, which can be opened or shut to admit seed to the planting drum or a planter box. Seed is picked up in the seed pockets from the planter drum or disk by a blower either applying internal pressure, or creating a vacuum in the drum, so that air flows across a plurality of pockets or indentations in the drum or disk. In this way, seeds are held against gravity through air flow around the seed and out of the pocket. When the drum or disk turns so that seeds are in the correct position, air flow is stopped either by rubber wheels contacting the outside of the drum, or a plate cuts off air flow. Seeds then drop by gravity into planter tubes, either for direct gravity fall into a furrow, or under air pressure in the drum pneumatically moving seed through the tube to the planting furrow. To permit seed to flow from the seed hopper to the planting drum, a pressure-equalizing conduit is connected between the top of the seed hopper and the drum.

In accordance with a preferred method of carrying out the present invention, a recirculating spray nozzle, also referred to as a "return-flow nozzle" or a "bypass nozzle", jets an emulsion at a controllable rate onto seeds passing through the delivery chute or transition section between the hopper and the drum. This nozzle is so located that seeds are sprayed just before they enter the drum, that is, a few inches from the end of the delivery chute. In this way, promptly after the seed is coated, the blower system, operating through the rotating drum and the perforations therein, establishes a high air flow rate across the wetted seeds. The seeds are further dried as they are picked up and rotated in the indents or seed pockets of the drum, so that they are substantially dry by the time they are dropped by gravity into the seed delivery tube or tubes. In a preferred form of apparatus for carrying out the method of the present invention, the treatment system includes a pump for circulating treating fluid from a storage tank to the bypass nozzle through a hydraulic control circuit that includes pressure valve means responsive to pressure in the conduit from the pump to the bypass nozzle for controlling the rate of fluid flow. When pressure in the conduit is above a predetermined value, return conduit means continuously returns fluid from the bypass nozzle to the storage tank at a controlled rate, so that a limited, but controllable amount of fluidized treating material is jetted as a fine mist onto seeds in the seed delivery chute as they pass from storage hopper to distribution drum.

Further in accordance with the preferred form of the invention, electrically operated solenoid valves in both the supply conduit and the return conduits activate the pressure control system. Alternatively, a simple, manually operated on-off valve activates the pressure control system by opening or shutting off a total bypass loop from the pump directly back to the storage tank. In either case, when flow to the nozzles is in the "off" position, the pressure valve recirculates emulsified treating fluid so that if the emulsion is likely to settle or "break" without mixing, it will not plug the piping. The amount of flow is regulated by the pressure valve means so that more or less fluid is returned or bypassed back to the tank. In this way, quite low spray rates, on the order of 0.05 to 5.0 gallons per hour (approximately 3 to 300 cc per minute) can be obtained.

Further objects and advantages of the present invention will now become apparent from the following description of preferred embodiments of apparatus for carrying out the method, as particularly illustrated in the accompanying drawings which form a part of this application.

In the drawings:

FIG. 1 is a side elevation view of one form of plateless planter, partially in cross section, to which the present invention has been applied, and suitable for carrying out the method of the invention.

FIG. 2 is an end elevation view of the apparatus shown in FIG. 1.

FIG. 3 is a detailed cross-sectional view taken in the direction of arrows 3—3, as shown in FIG. 1, particularly illustrating the planter seed drum drive mechanism and the blower system.

FIG. 4 is a cross-sectional view taken in the direction of arrows 4—4 as shown in FIG. 1, illustrating the drive mechanism for the seed drum, blower and pump for the liquid seed treatment distribution system.

FIG. 5 is a side elevation view of an alternate form of plateless planter to which the present invention is applicable.

FIG. 6 is an end elevation view, partly in cross-section, of the apparatus shown in FIG. 5, wherein the fluid spray system is illustrated in greater detail.

PREFERRED EMBODIMENTS

Referring now to the drawings, and in particular FIG. 1, planter 10 is adapted to be drawn by a tractor, not shown, in the direction of arrow 11. Planter 10 is of the "plateless type", that is, one in which a furrow is opened by a furrow-opener 13 which cuts ground 15 to a desired depth so that seed 17 may be metered into the furrow through tube 23. Seeds 17 are then covered by the action of a pair of disks 19 turning soil over the seed. The furrow is then tamped by a press wheel 21.

In the arrangement of FIG. 1, seeds 17 are metered to the furrow through delivery tubes 23 from seed planting drum 25. Drum 25 is driven in synchronism with movement of planter 10, as best seen in FIG. 3, by planter drive wheels 27 through a sprocket and chain drive, including chain 29, drive shaft 31 and beveled gears 33 and 35, which turn shaft 37, directly coupled to seed planting drum 25. Additionally, in this system, seeds are delivered to the individual planter, or delivery, tubes 23 pneumatically by blower means 40 which creates a pressure differential across the seed pockets 42 in drum 25. In the present embodiment, blower 40 applies higher than atmospheric pressure to the interior of drum 25 so that seeds delivered from said hopper 43 by way of delivery chute 45 inclined relative to vertical, are individually picked up by pockets 42 and held by the pressure differential across each seed and around the imperfect seating of the seed in the indentation or pocket 42 until drum 25 rotates a full half revolution. At this point, rotating rubber press wheels 47 terminate the pressure differential across indentations 42 so that seed drops by gravity into a manifold 49 which holds the upper ends of a multiplicity of planting tubes 23. Press wheels 47 are mounted for rotation on U-shape frame 48 pivoted on pins 50. Wheels 47 engage or disengage from drum 25 by the position of handle 52.

To assure that pressure inside seed hopper 43 and drum 25 are equalized, an air pressure equalizing tube 52 communicates with the internal portion of drum 25 and the top of said hopper 43. Seed hopper 43, of course, is closed by pressure cover 53 so that seed is not blown out of hopper 43.

As will be understood from the present arrangement, but not heretofore appreciated, blower means 40, in fact, creates heat by compression of air as it is forced into drum 25. Thus, in effect air flowing through drum 25, and heated by such compression acts in conjunction with the seed spray treatment system to produce an unusual and surprising result in that wet coated seeds are quickly dried. Where seeds are lightly coated in accordance with the present invention, at not more than about 2 gallons per hour and preferably in the range of 0.2 to 0.7 gallons per hour, such a coating is quickly dried by air flowing through and over the seeds as they are pressed into indentations 42 for delivery to seed tubes 23. Accordingly, the thin emulsion coating carrying the seed protectant material is adequately dried by the time the seed is released by wheels 47 into manifold 49 for transmission through planter tubes 23 to the furrow.

Further, in accordance with the invention, as discussed before, the treating fluid is sprayed on seed flowing through the lower end of delivery chute 45. For this purpose, a metering or bypass nozzle 55 is preferably mounted directly on the wall of the lower cutlet end 57 of tube 45.

A bypass nozzle particularly suited for use in the present invention is manufactured by Delavan Company, West Des Moines, Iowa, and sold under the name "Bypass Nozzle". The device is particularly characterized by a swirl chamber into which liquid, such as the treating emulsion in the present case, enters the swirl chamber through tangential slots. From the swirl chamber liquid is sprayed out through a nozzle. At the rear of the swirl chamber, a return flow orifice permits liquid to be removed from the swirl chamber after a portion of the energy of the liquid is extracted by friction in the chamber. Return flow through the central orifice is directly opposite the swirl chamber or discharge orifice to permit up to full flow of the incoming fluid to the return flow line. In this way, the total flow from the nozzle may be varied from zero to full flow by adjusting the return flow. In the present arrangement, the nozzle is operated so that back-flow is held substantially constant and the supply pressure is varied in accordance with the desired volume of flow. While the nozzle is primarily designed as an engine fuel atomizing nozzle, its application to the present arrangement is particularly satisfactory for applying exceptionally low flow, atomized spray of emulsion to seeds entering drum 25 through chute 45.

Fluid is supplied to the swirl chamber (not shown) of nozzle 55 by line 58 connected to an electrically actuated hydraulic control circuit that includes tee 59, one branch of which is connected to pump 61 by line 63. Line 65 supplies fluid to the pump from storage container or tank 67 through cut-off valve 68. Return of fluid to the tank from nozzle 55 is through line 71, leading from the bypass port of nozzle 55 to the top of tank 67. While also not indicated in the drawing, nozzle 55 includes a spring-loaded ball check valve which may be adjusted so that fluid will only be delivered to the nozzle when pressure in line 58 exceeds a predetermined minimum value.

Control of fluid flow to and from nozzle 55 is through an electrical control circuit that includes a magnetic sensor, indicated by magnet 73 mounted on shaft 37 and detector 75 which transmits pulses to control panel 66 when shaft 37 rotates. Such pulses sensed at panel 66 actuate solenoids 69 and 70 to open valves 76 and 78, respectively, in lines 58 and 71. With valves 76 and 78 open, fluid continuously circulates from tee 59 through line 58, nozzle 55 and line 71 back to tank 67. When valves 76 and 78 are closed, bypass of all fluid from pump 61 back to tank 67 is through line 79 out of tee 59, connected to pressure gauge 85, lines 81 and 83, and a pressure control valve 87. Regulation of pressure valve 87, as by way of lever 89, controls the actual flow rate through the flow circuit from pump 61, tee 59 and line 58 to nozzle 55 and the return through line 71 from bypass nozzle 55. Operation of the magnetic control circuit may be remote, as by way of power line 80 connected to panel 66.

A particular virtue of the arrangement just described is that solenoid valves 76 and 78 may be operated by the tractor drawing the planter mechanism forward. In this way, spraying can begin as soon as the planting operation is initiated by drive provided by the support wheels 27, driving gear chain 29 which through sprocket gears (not shown) are driven by axial 30 of wheel 27, turning a similar sprocket gear to drive shaft 32. In turn, shaft 31 rotates through a bevel gear arrangement as seen in FIG. 3. As there indicated, bevel gears 33 and 35 drive shaft 37 on which drum 25 is directly mounted. In the present arrangement, the drive of blower fan 44 of blower 40, as well as pump 61 of the fluid spraying system, are driven by a common drive shaft 46 through belt and pulley arrangements indicated generally as 36 for blower 44 and 38 for pump 61. In the present embodiment, the drive of shaft 46 is through an electric motor, indicated generally at 60, supplied by a pair of power lines 62 and 64 connected to a battery (not shown) or the tractor electrical system. Alternatively, motor 60 may be hydraulically driven by hydraulic fluid supplied by lines connected to a hydraulic power source on the tractor. Further, the motor may be driven directly by a power take-off (PTO) unit on the prime mover, the tractor or other drive unit, for planter 10.

It is, of course, to be understood that frequently a tractor, such as that used for planting grain, will include a mechanical power take-off unit which can be used to directly drive shaft 46 through a suitable set of universal couplings. Such a power take-off unit, of course, includes generally a speed reduction gearing mechanism to permit variation in the speed of the drive for blower means 40 or pump 61.

As indicated in both FIGS. 1 and 4, a gate member 60 is disposed in delivery chute 45 to control flow of grain from hopper 43 to drum 25. As particularly shown in FIG. 4, this gate may be operated as by latch finger 72, which slides member 74 to rotate gate 70.

Referring now to the alternate arrangement shown in FIGS. 5 and 6, there is indicated another form of apparatus suitable for performing the method of the present invention. In this embodiment, rather than a planting drum, a planting plate 125, having pockets 142, selects seeds from chamber 129 by the application of pressure from blower or fan 140 through air delivery tube 144. A pressure equalization tube 151 equalizes pressure in seed hopper 143 so that seeds may drop by gravity through delivery tube 145 to chamber 129. Control of seeds from hopper 143 through chute 145 is under control of a slide valve 160.

As particularly distinguished from the embodiment of FIGS. 1 to 4, the arrangement of FIGS. 5 and 6 is a single tube plateless planter in which the single tube delivers seed directly to a furrow cut by a combined furrow opener and closer represented by plow blade 113. Since only a single row of seed is involved, seeds are disengaged from pockets 142 by rotation of disk 125, so that cut-off plate 147 terminates air flow across pockets or indents, 142. Thus, plate 147 serves the same function as rubber wheels 47 in the embodiment of FIGS. 1-4. In such an arrangement, when air is not being forced through the seed pockets 142 and around the seed therein, seed drops by gravity into planter tube 123 and directly into the furrow being cut by plow blade 113 as the entire unit is pulled forward as by linkage 111. FIG. 6 particularly illustrates the location of bypass nozzle 55 in delivery chute, or tube, 145, as well as the connection of supply line 58 and return line 71.

It will be understood from the foregoing description that the arrangement of holding seed in plate 125 can easily be reversed by applying vacuum rather than pressure across the openings 142. This would, of course, require reversal of plate 125 and the position of seed pick-up hopper 129 which holds seeds after they are coated. The drying process for certain grains will be less effective than where the seed is coated using a positive pressure system across the planter disk or drum due to the loss of heat of compression of air. However, such loss of heat may be acceptable with some small seeds, such as carrots, beets, milo, sorghum, and the like.

As an example of the value of the treatment made possible by the method of the present invention, treatment of seed corn was made with equipment of the form shown in FIGS. 1 to 4. The seeds were treated with a fungicide (Captan) and an insecticide (Lindane). The fungicide controlled seedling disease, while the insecticide controlled soil insects, specifically wireworms. The rate of spray of an emulsion containing the combination of powdered insecticide and fungicide was formed as an oil-in-water emulsion and then introduced into tank 67. The rate of flow was adjusted so that the spray was not more than 1.5 gallons per hour, and preferably from about 0.2 to 0.7 gallons per hour. The liquid to dry powder ratio was in the range of about 1 pound to ½ gallon, so that it was possible to spray a very dry emulsion onto the seeds that would quickly dry by flow of air heated by compression by blower 40 forcing air through planter drum 25, thereby to avoid coating or loss of material in drum 25 or in manifold 49 or planter tubes 23.

Various modifications and changes will become apparent to those skilled in the art from the foregoing description of the method and apparatus for performing the method. All such modifications or changes that come within the scope of the appended claims are intended to be included therein.

What is claimed is:

1. An in-the-field spray coating system adapted to be attached to a planter unit with power take-off means, said unit having at least one seed hopper for sorting seed, a blower, a delivery chute interconnecting said hopper to a rotatable drum, and at least one delivery tube for distributing seeds from the drum for planting whereby seeds may flow from said hopper through said delivery chute and into said drum and then by air pressure introduced by said blower into said drum from said drum into said at least one delivery tube for insertion into the ground, said seed spray coating system comprising:

a storage tank for a fluidized treatment material attachable to said planter unit so as to move with said planter unit;

jet nozzle means positioned in said delivery chute to disperse said fluidized treating material as a mist into said delivery chute;

conduit means from said tank to said jet nozzle means;

a pump for pumping said fluidized treating material from said storage tank through said conduit means;

valve means in said conduit means for controlling flow from said pump to said jet nozzle means;

pressure valve means responsive to pressure in said conduit means adapted to control the rate of flow of said material to said nozzle means, return conduit means between said jet nozzle means and said storage tank for continuously returning a predetermined flow of said fluidized treating material to said storage tank in accordance with the setting of said valve means;

whereby said fluidized treating material may be jetted as a mist into said delivery chute so that said mist costs said seeds and whereby said treated material is at least partially dried thereon by air flow from said blower in distributing seeds to said at least one delivery tube for planting in a furrow.

* * * * *